(12) United States Patent
Drocco (10) Patent No.: US 6,997,597 B2
(45) Date of Patent: Feb. 14, 2006

(54) KNEADING MACHINE FOR FOOD DOUGHS, PARTICULARLY FOR BAKERY PRODUCTS

(75) Inventor: Davide Drocco, Alba (IT)

(73) Assignee: Sancassiano S.p.A., Cuneo (IT)

( * ) Notice: Subject to any disclaimer, the term of this patent is extended or adjusted under 35 U.S.C. 154(b) by 128 days.

(21) Appl. No.: 10/720,139

(22) Filed: Nov. 25, 2003

(65) Prior Publication Data

US 2004/0213078 A1    Oct. 28, 2004

(30) Foreign Application Priority Data

Nov. 26, 2002   (IT) .......................... TO2002A1020

(51) Int. Cl.
*A21C 1/02* (2006.01)

(52) U.S. Cl. ......................................... 366/94; 366/224
(58) Field of Classification Search ............ 366/92–95, 366/221–222, 224, 297, 306, 200; 99/348
See application file for complete search history.

(56) References Cited

U.S. PATENT DOCUMENTS

| | | | | |
|---|---|---|---|---|
| 2,115,742 A | * | 5/1938 | Newton | 366/222 |
| 2,184,225 A | * | 12/1939 | McDuffee et al. | 366/288 |
| 2,610,042 A | * | 9/1952 | Dryon | 366/288 |
| 3,262,680 A | * | 7/1966 | Balazer | 366/207 |
| 3,420,507 A | * | 1/1969 | Eirich et al. | 366/192 |
| 3,749,373 A | * | 7/1973 | Kemper | 366/76.6 |
| 4,375,336 A | * | 3/1983 | Halley | 366/77 |
| 4,436,432 A | * | 3/1984 | Drocco | 366/95 |
| 4,504,152 A | * | 3/1985 | Moller et al. | 366/188 |
| 4,765,746 A | * | 8/1988 | Suay Puig | 366/77 |
| 4,919,539 A | * | 4/1990 | Drocco | 366/94 |
| 5,150,968 A | * | 9/1992 | Inoue | 366/288 |
| 5,207,506 A | * | 5/1993 | Musseau et al. | 366/95 |
| D344,208 S | * | 2/1994 | Musseau | D7/376 |
| 5,312,183 A | * | 5/1994 | Drocco | 366/97 |
| 5,482,366 A | * | 1/1996 | Konig et al. | 366/97 |
| 5,498,074 A | * | 3/1996 | Moller et al. | 366/94 |
| 5,580,167 A | * | 12/1996 | Drocco | 366/97 |
| 6,533,448 B1 | * | 3/2003 | Drocco | 366/98 |
| 6,652,133 B2 | * | 11/2003 | Ghanizadeh Khoub | 366/95 |
| 6,652,137 B1 | * | 11/2003 | Bosch et al. | 366/288 |
| 2002/0075751 A1 | * | 6/2002 | Ghanizadeh Khoub | 366/95 |
| 2003/0053368 A1 | * | 3/2003 | Drocco | 366/98 |
| 2003/0167931 A1 | * | 9/2003 | Mazza et al. | 99/348 |
| 2004/0213078 A1 | * | 10/2004 | Drocco | 366/94 |
| 2005/0111295 A1 | * | 5/2005 | Drocco | 366/97 |

FOREIGN PATENT DOCUMENTS

| | | | |
|---|---|---|---|
| DE | 19621286 A1 | * | 11/1997 |
| EP | 0315599 A1 | * | 5/1989 |
| EP | 0496182 A1 | * | 7/1992 |
| EP | 0 354 190 B1 | | 9/1992 |
| EP | 0551571 A1 | * | 7/1993 |

(Continued)

*Primary Examiner*—Charles E. Cooley
(74) *Attorney, Agent, or Firm*—Sughrue Mion, PLLC (57) ABSTRACT

A kneading machine for flour-based mixes, particularly for bakery products, comprises two kneading implements turning within a rotating tank having a cylindrical shape, with concordant directions of rotation, about two axes, which are parallel to the axis of the tank and are set at a distance from the axis of the tank so as to describe two theoretical cylinders that are substantially tangential both with respect to one another and with respect to the circumferential wall of the tank. Each arm describes an orbital movement about the respective axis of rotation and is set inclined with respect to a straight line generatrix of its theoretical cylinder.

12 Claims, 11 Drawing Sheets

FOREIGN PATENT DOCUMENTS

| | | | |
|---|---|---|---|
| EP | 0554513 A1 | * | 8/1993 |
| EP | 1135983 A1 | * | 9/2005 |
| FR | 2546719 | * | 6/1983 |
| JP | 2002-165710 | * | 6/2005 |
| WO | 2004/010786 A1 | * | 2/2005 |

* cited by examiner

KNEADING MACHINE FOR FOOD DOUGHS, PARTICULARLY FOR BAKERY PRODUCTS

BACKGROUND OF THE INVENTION

The present invention relates to kneading machines for food doughs, particularly for bakery products, of the type comprising a substantially cylindrical tank and a pair of kneading implements turning within the tank, with concordant directions of rotation, about two axes that are substantially parallel to the axis of the tank and are set at a distance from the axis of the tank, so as to describe two theoretical cylinders that are substantially tangential both with respect to one another, and with respect to the circumferential wall of the tank.

A kneading machine of the type indicated above is described and illustrated in the European patent EP OR 354 190 B1 and in the corresponding U.S. Pat. No. 4,919,539 in the name of the present applicant. In said machine, the two kneading implements are in the form of helical spirals that wind about a theoretical cylindrical surface through an angle considerably greater than 180° and in a typical case even greater than 360°, which corresponds to a situation in which the axial dimension of the kneading implement is close to the value of the pitch of the helical spiral.

Even though the aforesaid known machine has already represented a substantial improvement over more traditional machines, which use a single spiral kneading implement, the present applicant has in any case proceeded with studies and tests aimed at providing a kneading machine, which will be optimal both from the point of view of the quality of the mix obtained and from the point of view of the productivity of the machine, as well as from the point of view of a simplification in design and reduction in the costs for fabrication of the machine itself. In particular, the aim has been to achieve progress in order to reduce the increase in temperature that occurs with the operation of mixing in known machines.

SUMMARY OF THE INVENTION

With a view to achieving said purpose, the subject of the present invention is a kneading machine, comprising:
a substantially cylindrical rotating tank; and
a pair of kneading implements turning within the tank, with concordant directions of rotation, about two axes substantially parallel to the axis of the tank and set at a distance from the axis of the tank, so as to describe two theoretical cylinders that are substantially tangential both with respect to one another and with respect to the circumferential wall of the tank,
characterized in that:
each kneading implement comprises at least one arm;
each arm extends on the periphery and from one end to the other of the theoretical cylinder, which has an axis coincident with the respective axis of rotation of said arm, in such a way that said arm describes an orbital movement about the respective axis of rotation;
each arm, for a substantial part of its length, is inclined with respect to a straight line generatrix of said theoretical cylinder parallel to said axis of rotation of the arm;
the opposite ends of the two arms are staggered with respect to one another, viewed in the direction of the axis of rotation, by an angle smaller than a 180° about said axis of rotation;
the orbital movements of said arms about the respective axes of rotation are synchronized with respect to one another, in such a way that they pass simultaneously in the area of tangency of the respective theoretical cylinders, crossing one another in opposite directions of movement as a result of the concordant rotation of the two implements.

The tests conducted by the present applicant with a kneading machine having the aforesaid characteristics have shown that it is able to produce a mix of excellent quality, thanks to the shearing action to which the mix is subjected whenever the two arms of the kneading implements pass in the area of tangency of the respective theoretical cylinders crossing one another in opposite directions of movement.

In a preferred embodiment, the aforesaid arms are inclined in a concordant way with respect to the generatrices of their theoretical cylinders so that when they intersect in the aforesaid area of tangency they are arranged so that they cross one another so as to give rise to a scissors-like shearing action. There is not in any case excluded an embodiment in which the two arms of the kneading implements will be inclined in an opposite way with respect to the generatrices of their theoretical cylinders.

In the case of the preferred embodiment, in which the two arms are inclined in a concordant way, preferably each arm is set according to a portion of helix extending on the periphery of its theoretical cylinder, and from one end to the other of said cylinder according to an angle smaller than 180°, viewed in the direction of the axis of rotation.

Once again preferably in the case of the aforesaid preferred embodiment, the two aforesaid theoretical cylinders have diameters and heights that are substantially equal, the two portions of helix defining on said arms are substantially equal, and the speed of rotation of the arms are also substantially equal, so that the area of tangency of the two arms shifts progressively during their intersection in a direction parallel to the axes of the two theoretical cylinders and from one end to the other of said cylinders.

Once again with reference to a further preferred characteristic of the invention, no other members are provided inside the tank other than the two kneading implements. This constitutes a further difference with respect to the solution forming the subject of the European patent EP 0 354 190 B1 in the name of the present applicant, where inside the tank there is also provided a contrast member co-operating with the kneading implements. Preferably, the theoretical cylinders of the two kneading implements each have a diameter that is sufficiently high so that each of said cylinders, viewed in the direction of its axis, is not contained in just one quadrant of the tank. Once again in the case of the preferred embodiment, the plane of tangency of the two theoretical cylinders is also a diametral plane of the tank.

Again with reference to a preferred example of embodiment of the invention, a kneading machine having all the aforesaid characteristics has proved particularly efficient, in which the angle in plan view described by each helical arm is comprised between 20° and 100° and is preferably equal to approximately 45°, whilst the angle of inclination of each helical arm is preferably comprised between 15° and 40° and in particular is substantially equal to 20°.

Again a further important characteristic of the invention lies in the fact that the cross section of each of said arms defines an edge which is substantially shearing along the cylindrical surface of the respective theoretical cylinder. Said cross section may, for example, be in the form of a square, or rhomboid, with the two cutting edges of the two arms set opposite to one another.

BRIEF DESCRIPTION OF THE DRAWINGS

Further characteristics and advantages will emerge from the ensuing description with reference to the annexed drawings, which are provided purely by way of non-limiting example and in which.

DETAILED DESCRIPTION OF THE INVENTION

With reference to FIGS. 1 to 4, the reference number 1 indicates as a whole a kneading machine for alimentary mixes, particularly flour-based mixes for bakery products.

The machine 1 comprises, in a way in itself known (see, for example, the previous European patent in the name of the present applicant EP 0 354 190 B1), a fixed structure 2, to which there may be coupled a carriage 3, provided with wheels 4 and a handle 5, with the aid of a hydraulic-blocking system (also of a known type and not illustrated). The carriage 3 supports in a rotary way, i.e., turning about a vertical axis 6, a cylindrical tank 7 having a circular shape. The fixed structure 2 constitutes a casing containing a motor-reducer assembly 8, which is designed to set the tank 7 in rotation about its axis 6 by means of at least one wheel 9 that draws the tank 7 by friction, the said wheel 9 being in contact with the outer surface of a base portion 10 of the tank 7. Once again in a way in itself known, the machine comprises a head structure 11, which is articulated to the fixed structure 1 by a hinge 12. The head structure 10 projects in cantilever fashion above the tank 4, which is designed to receive the mix and supports two kneading implements 13 in such a way that the latter turn about two axes 14 that are parallel with respect to one another and parallel moreover to the axis 6 of the rotating tank. The conformation and the disposition of the two kneading implements constitute the heart of the present invention and will be described in detail in the what follows. Once again in a way in itself known, the two kneading implements 13 can be driven in rotation by an electric motor 14 with a belt transmission 15, which includes a pulley 16 mounted on the shaft of the electric motor 14, a pulley 17 mounted in a rotating way in the structure of the head 11 and connected in rotation to the pulley 16 by a belt 18 (see FIG. 2) and a gearcase 19 (see FIG. 3), which connects in rotation the two shafts or spindles 20 that carry the kneading implements 13 (see FIG. 3).

Figure 1:
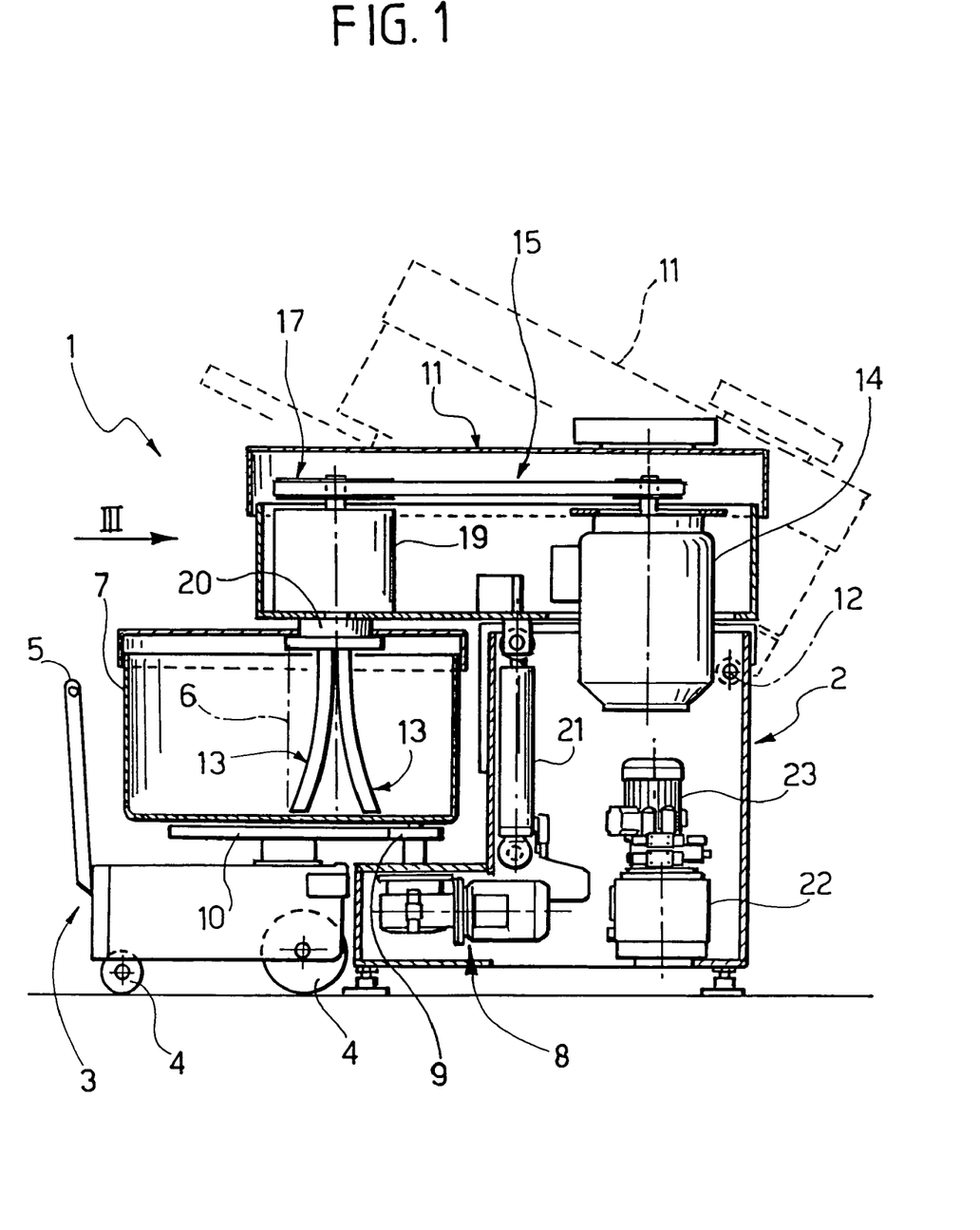
FIG. 1 is an elevation in cross-sectional view of a preferred embodiment of the kneading machine according to the invention.
Figure 2:
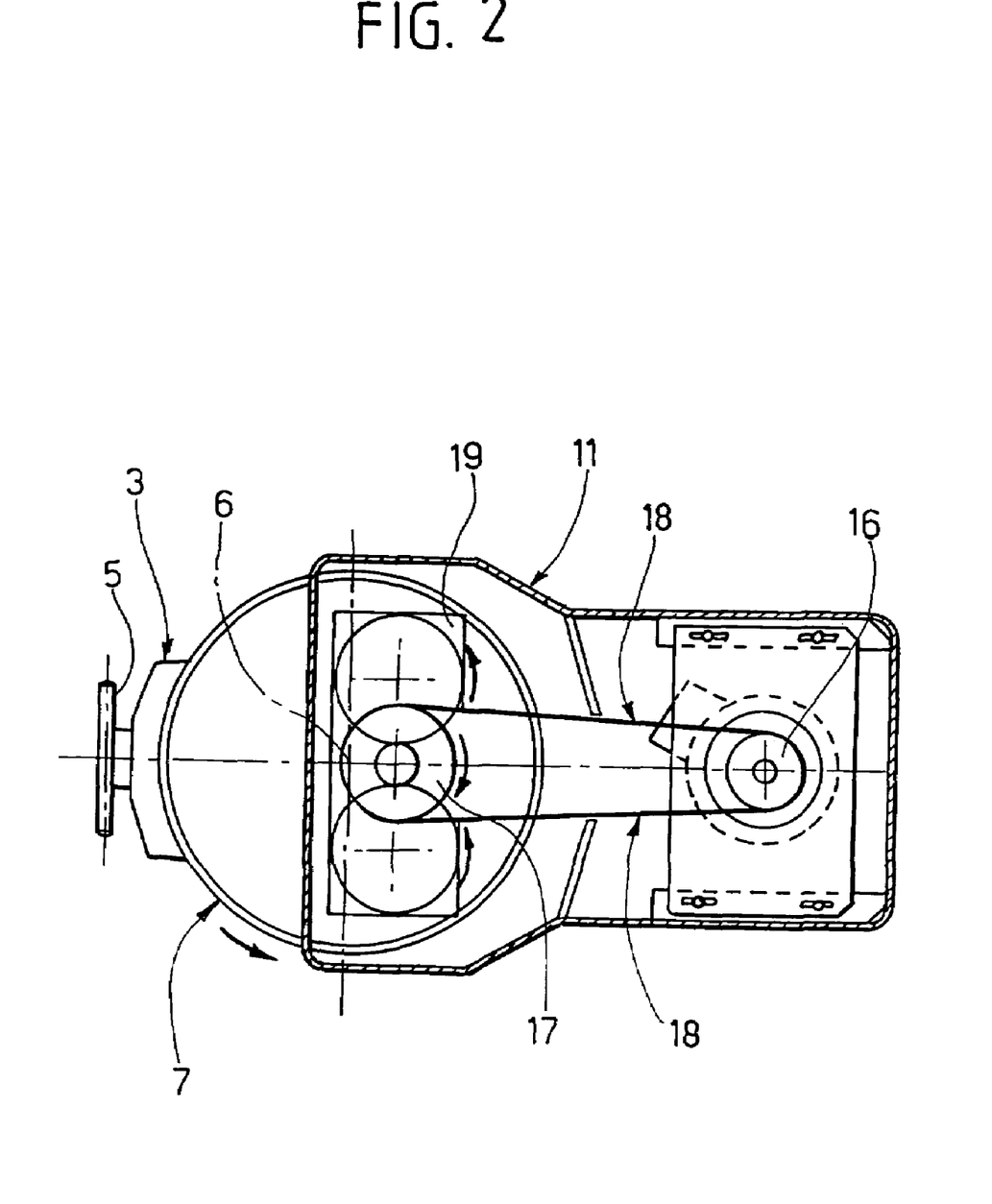
FIG. 2 is a partially cross-sectional plan view of the machine of FIG. 1.
Figure 3:
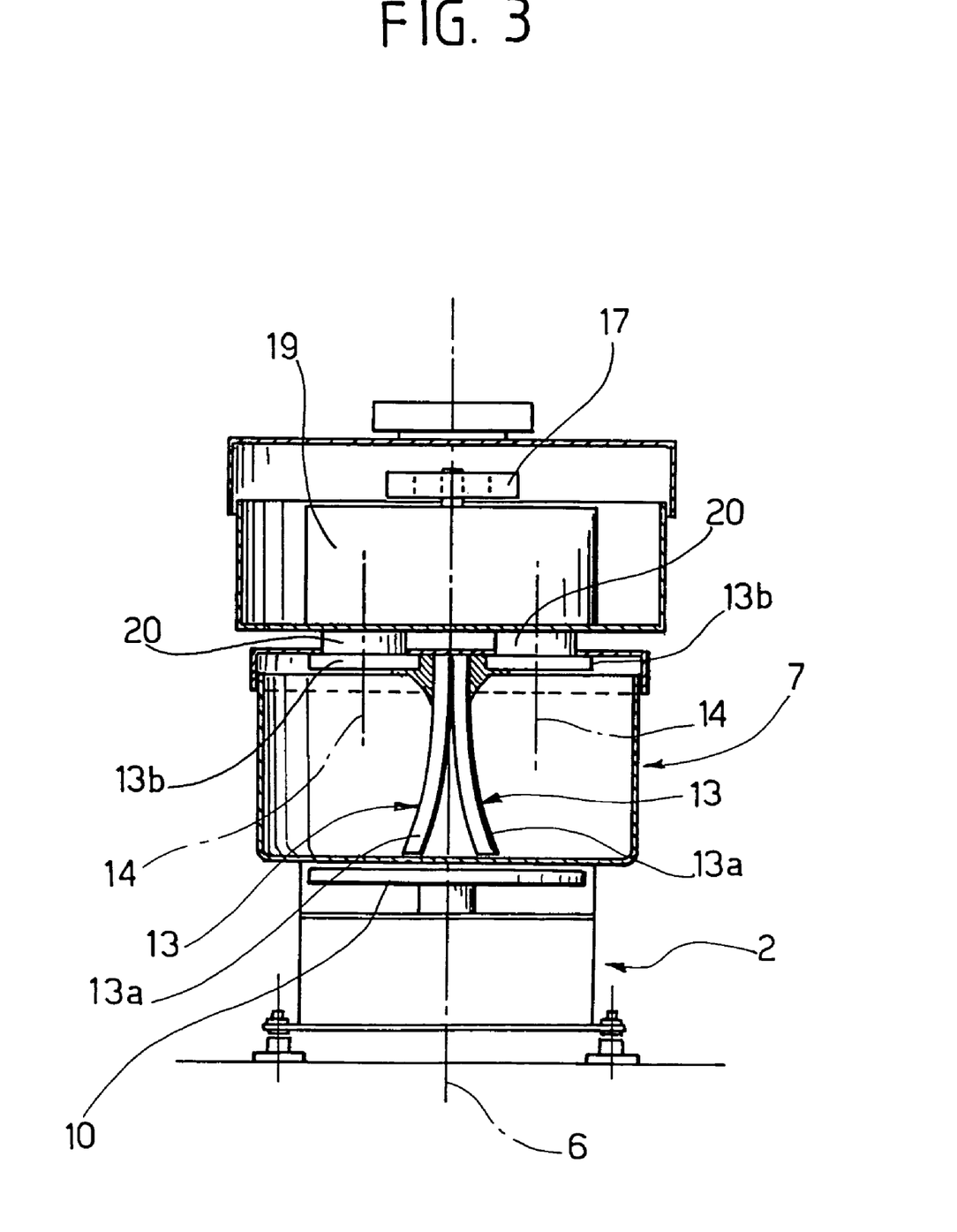
FIG. 3 is a further schematic elevation, in the direction of the arrow III of FIG. 1, partially sectioned.
Figure 4:
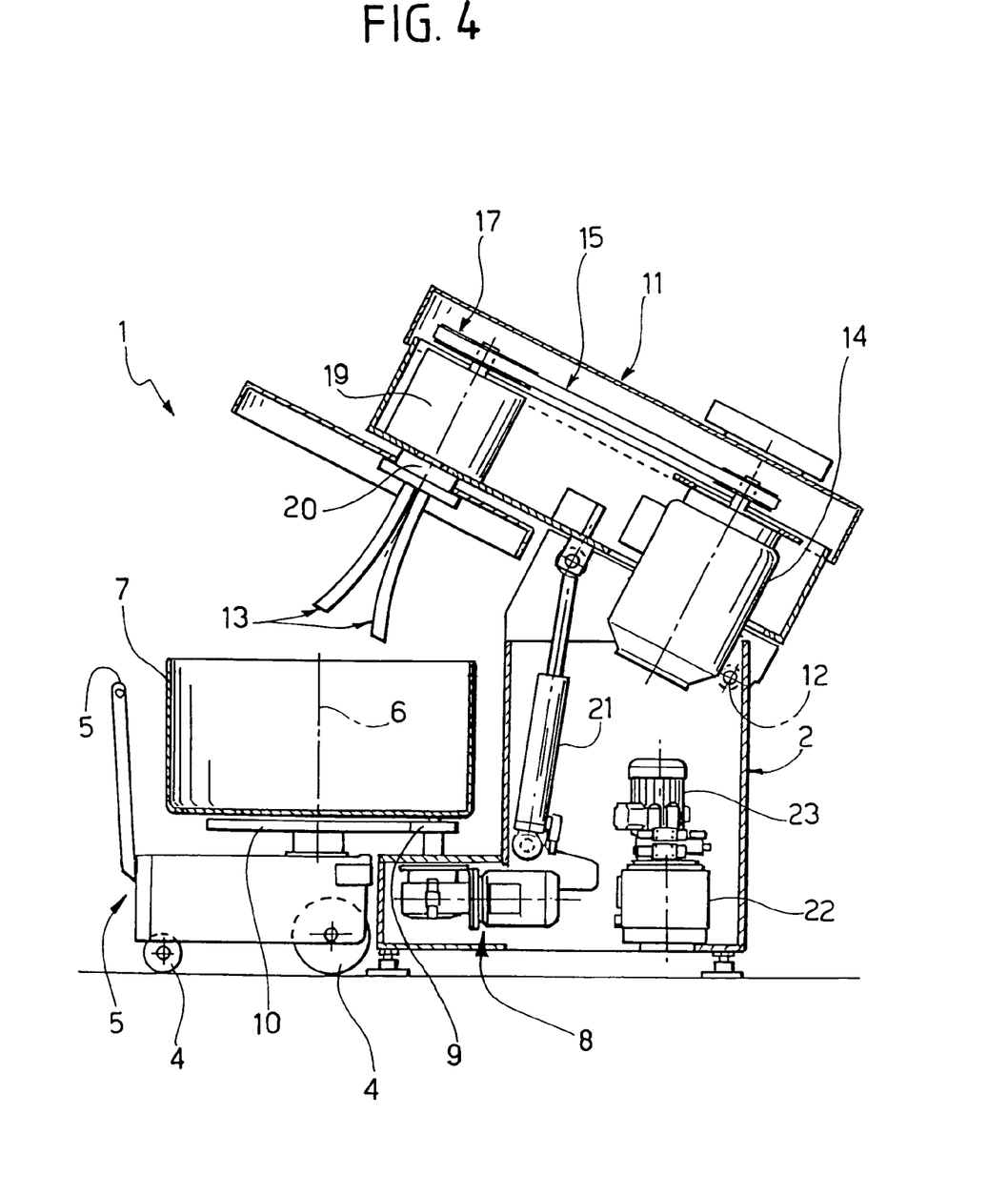
FIG. 4 is a view corresponding to that of FIG. 1 which illustrates the machine in a different operating condition.

Once again in a way in itself known, a hydraulic cylinder 21 is provided (FIG. 1), which is controlled by a hydraulic power unit 22 driven by an electric motor 23, for raising the head structure 11 from the operating position illustrated by a solid line in FIG. 1, where the two kneading implements 13 carried by the head 11 are set inside the tank 7, to a position rotated upwards about the hinge 12 (indicated by a dashed line in FIG. 1, as well as illustrated in a complete way in FIG. 4), where the kneading implements 13 are set completely above the tank 7 so as to enable approach of the carriage 3, with the tank 7 set above it to the structure of the machine, prior to a kneading operation, as well as recession therefrom of the carriage 3 with the tank 7 carried by it at the end of a kneading operation. Of course, the invention is applicable also to machines with tanks not carried by a carriage, but instead integrated in the machine.

Again with reference to the belt transmission 15 that is used for setting in rotation the two kneading implements 13, the example provided illustrates a case in which said transmission is shaped and set in such a way as to set in rotation the two kneading implements 13 at the same speed, the theoretical cylinders of rotation of said implements also being of the same size, as will be illustrated in detail in what follows.

There is nothing, however, to exclude recourse to kneading implements with theoretical cylinders of rotation that have, for example, different diameters, in which case the transmission of the machine must be designed for rendering the speed of rotation of the two implements different from one another in order to preserve the advantages of the invention that will be illustrated in what follows. Furthermore, the transmission described hereinafter is also designed to obtain a speed of rotation of the kneading implements that is considered desirable, as a function of the speed of rotation that is imparted on the tank 7.

When it is desired to carry out a kneading operation, it is necessary to block the carriage 3 carrying the tank 7 (which is filled with the ingredients to be kneaded) on the supporting structure 2, said operation being performed with the head 11 in its raised position. Once the carriage 3 is coupled, the head 11 is lowered so as to cause the two kneading implements 13 to penetrate inside the tank 7. It is thus possible to set under way the kneading operation, starting up rotation of the two kneading implements 13 and at the same time rotation of the tank 7.

Figure 5:
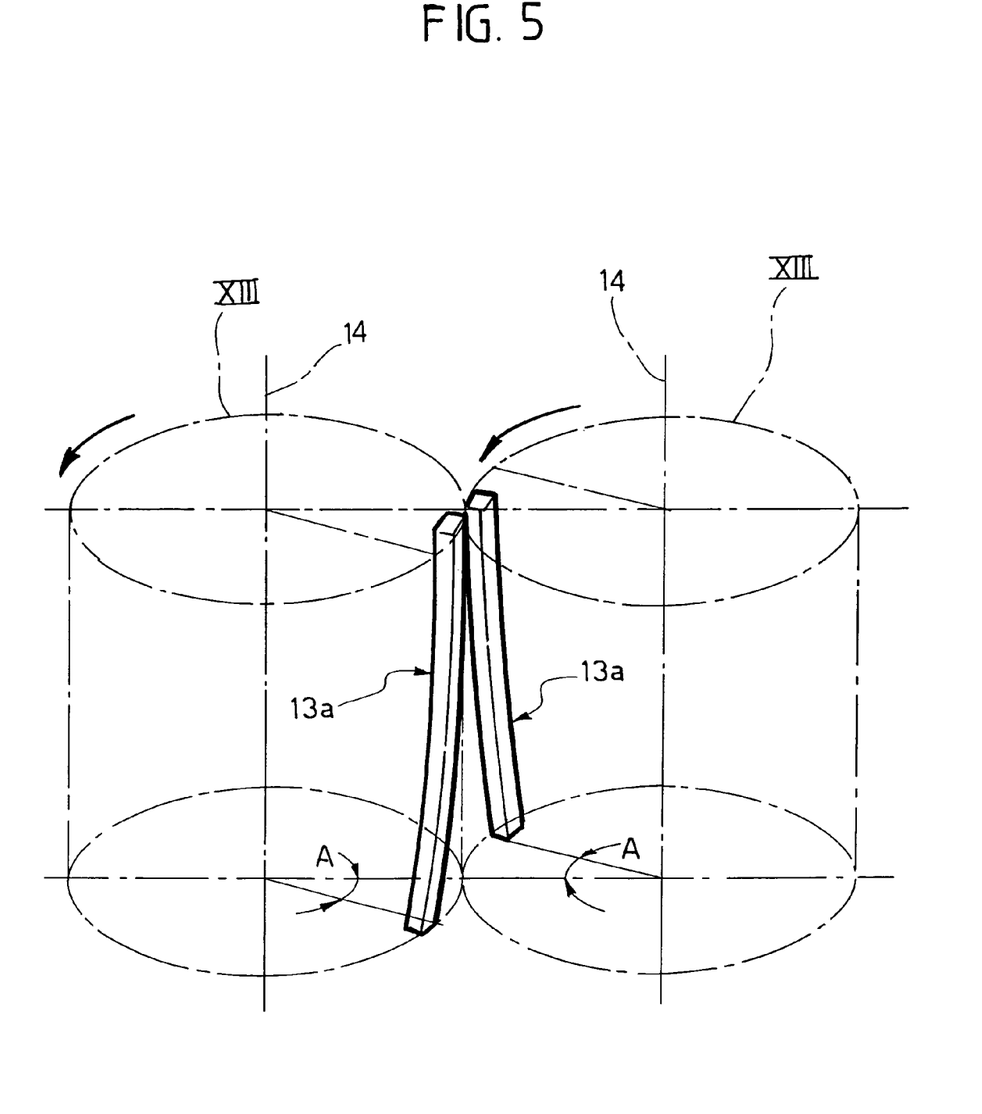
FIG. 5 illustrates at an enlarged scale the two arms of the kneading implements of the machine according to the invention and the theoretical cylinders described by them in their orbital movement about the respective axes of rotation.
Figure 6:
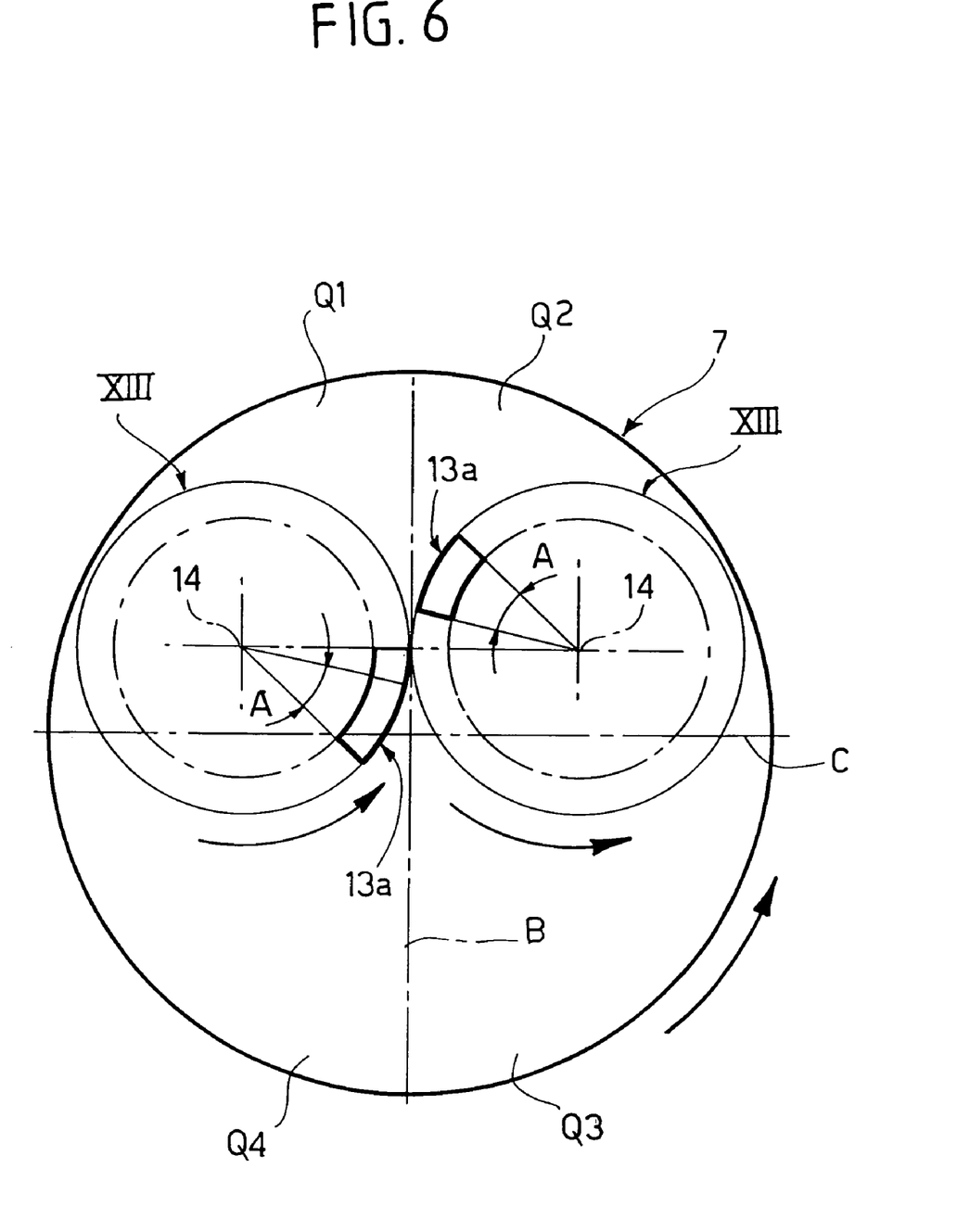
FIG. 6 is a schematic plan view of the two arms of FIG. 5.

With reference once again to FIGS. 1 and 3, as well as to FIGS. 5 and 6, the machine according to the invention differs from the prior art above all on account of the conformation and disposition of the two kneading implements. With reference in particular to FIG. 5, the two implements 13 comprise two arms 13a that extend downwards, each starting from a peripheral area of two circular plates 13b carried by the two spindles 20. The two arms 13 extend substantially for the entire height of the tank 7 in such a way that their free ends, in the operating condition of the machine illustrated in FIG. 1, are close to the bottom wall of the tank.

Each arm 13a extends on the periphery, and from one end to the other, of a theoretical cylinder XIII having an axis coincident with the respective axis 14 of rotation of the kneading implement. As a result, each of the two arms 13a describes an orbital movement about the respective axis of rotation 14. As may be seen clearly in FIG. 5, each arm 13a is inclined, at least for a part of its length (in the example illustrated for its entire length) with respect to a straight line generatrix of its theoretical cylinder XIII, parallel to the axis of rotation 14. Theoretically, the arm 13a could be set according to a rectilinear direction inclined with respect to the generatrix.

In the example illustrated, however, each arm 13a has a helical configuration, corresponding to a helix of a pitch considerably greater than the height of the theoretical cylinder XIII, in such a way that the two opposite ends of each arm 13a are staggered with respect to one another, viewed in the direction of the axis of rotation (see FIG. 6) by an angle A, which, in the example illustrated, is approximately 30°. Of course, such a value is indicated here purely by way of example since it is in general sufficient for the purposes of achieving the advantages of the invention for said angle to be lower than 180°. It is in any case preferable for said angle to be between 20° and 100° and even more preferably for it to be between 20° and 45°. Correspondingly, the angle of inclination of the helix defined by each arm 13a is preferably comprised between 5° and 40° and is preferably in the region of 20°. The conformation described above of the helix defined by each arm 13a is important in so far as it represents an essential difference with respect to conventional kneading machines with spiral kneading implements. In the case of said known machines, the implements have a helical conformation with a pitch that is considerably smaller than the axial dimension of the respective theoretical cylinder, so that the two opposite ends of each implement are staggered with respect to one another, viewed in the direction of the axis of rotation, by an angle considerably greater than 180°. In the case of the present invention, it is, instead, important that the aforesaid angle should fall within the limits that have been defined above in order to obtain the advantages proposed. In fact, thanks to the conformation described above, each arm 13a of each kneading implement passes in the area of reciprocal tangency of the two theoretical cylinders XIII only once in each revolution of the implement, which is found experimentally to constitute an important condition for the purposes of obtaining a mix of the desired quality.

As may clearly be seen in FIG. 6, the two theoretical cylinders XIII are substantially tangential to one another on a diametral plane B of the tank 7 and are moreover each internally tangential to the cylindrical wall of the tank 7. Furthermore, unlike, for example, what is illustrated in the European patent EP 0 354 190 B1 in the name of the present applicant, each of the two cylinders has, according to a preferred embodiment, a diameter that is sufficiently large to cause the circular section of each cylinder to extend beyond the limits of the respective quadrant Q of the tank 7, where by "quadrant" is meant each of the four areas of the tank 7 that are delimited by the intersection of the diametral plane B with respect to the diametral plane C that is orthogonal to it. As may be clearly seen in FIG. 6, the cylinder XIII contained in the quadrant Q1 also projects into the quadrant Q4, and the theoretical cylinder XIII contained in the quadrant Q2 also projects into the quadrant Q3. As a further consequence of the said arrangement, the space inside the tank 7 is occupied only by the two kneading implements, without there being envisaged further members, such as for example a contrast member of the kneading implements, as is instead envisaged, for example, in the prior patent in the name of the present applicant that has been cited above.

As clearly illustrated by the arrows indicated in FIG. 6, the two kneading implements 13 are made to rotate in a concordant way (in the example illustrated, both in the counterclockwise direction viewed from above) and also in concordance with the direction of rotation of the tank 7 (which in the example illustrated is also counterclockwise, once again as viewed from above).

Furthermore, an important characteristic of the invention lies in the fact that the orbital movements of the two arms 13a about the axes 14 are synchronized with respect to one another in such a way that the two arms 13a pass simultaneously within the area of tangency of the respective theoretical cylinders XIII, intersecting one another in opposite directions of movement on account of the concordant rotation of the two implements. The said intersection in opposite directions of movement determines the fact that the portion of mix that is at the area of tangency is subjected to a sort of cutting action in the area of tangency between the two arms. Of course, as a consequence of the inclined conformation (rectilinear or helical) of the two arms, the area of contact between the two arms (see FIG. 5) shifts progressively during intersection of the two arms in a direction parallel to the axes 14 of the two theoretical cylinders XIII, from one end to the other of the two cylinders. For example, in the condition illustrated in FIG. 5, the area of contact is at the top end of the two cylinders. As the rotation proceeds, said area of contact shifts progressively along the generatrix of tangency, until it a reaches the opposite end.

As may likewise clearly be seen from FIG. 5, the two arms, are inclined in a concordant way with respect to the generatrices of their theoretical cylinders, in such a way that at their intersection in the aforesaid area of tangency they are arranged so that they cross one another, according to a scissors-like configuration, so as to enhance the aforesaid shearing effect that has been described above. However, nor is the case excluded in which the two arms are inclined in a discordant way (with reference to their direction of "screwing" on the respective theoretical cylinder) so that in the area of tangency they have inclinations that are parallel to one another. Furthermore, nor is it excluded that each arm may present a broken configuration, with portions of different inclination.

As already indicated above, the tests conducted by the present applicant have shown that the use of kneading implements that are shaped, arranged and controlled in the way described above enables a considerable improvement of the machine to be obtained from the point of view of the quality of the mix as compared, for example, to the case of the machine known from the prior patent that has been cited above. It is presumed that the said result will be due principally to the shearing effect that has been described above, which is brought about in the mix at each revolution of the kneading implements when the two inclined arms cross one another. At the same time, the fact that each of the two arms should be set at least approximately according to a helix with the ends staggered with respect to one another by an angle smaller than 180° involves an operation that is altogether different from the one that occurs in machines with implements shaped like a helical spiral, in which each implement has its end staggered with respect to the other by an angle greater than 180° and in general close to 360°. In said known condition, in fact, the contact in the area of tangency does not occur just once at each revolution of the implement and, furthermore, the action of thrust in an axial direction, to which the mix is subjected by the implements with helical spiral and which leads the mix being pressed against the bottom of the tank, is enhanced.

In addition to the fact that the quality of the mix is excellent, the machine according to the invention presents also the advantage of only requiring the use of kneading implements having an extremely simple structure and low cost of fabrication. At the same time, the duration of the kneading cycle is altogether comparable to that of traditional machines, and in particular of the machine illustrated in the prior patent that has been cited above.

For the purpose of enhancing the shearing effect described above, it is preferable if the two arms 13a present cutting edges set opposite to one another in the area of tangency. For this reason, the two implements can have a substantially square cross section, as may be seen in FIG. 6 and at an enlarged scale in FIG. 7, or even a trapezial or rhomboidal cross section, as illustrated in FIGS. 8 and 9.

Figure 10:
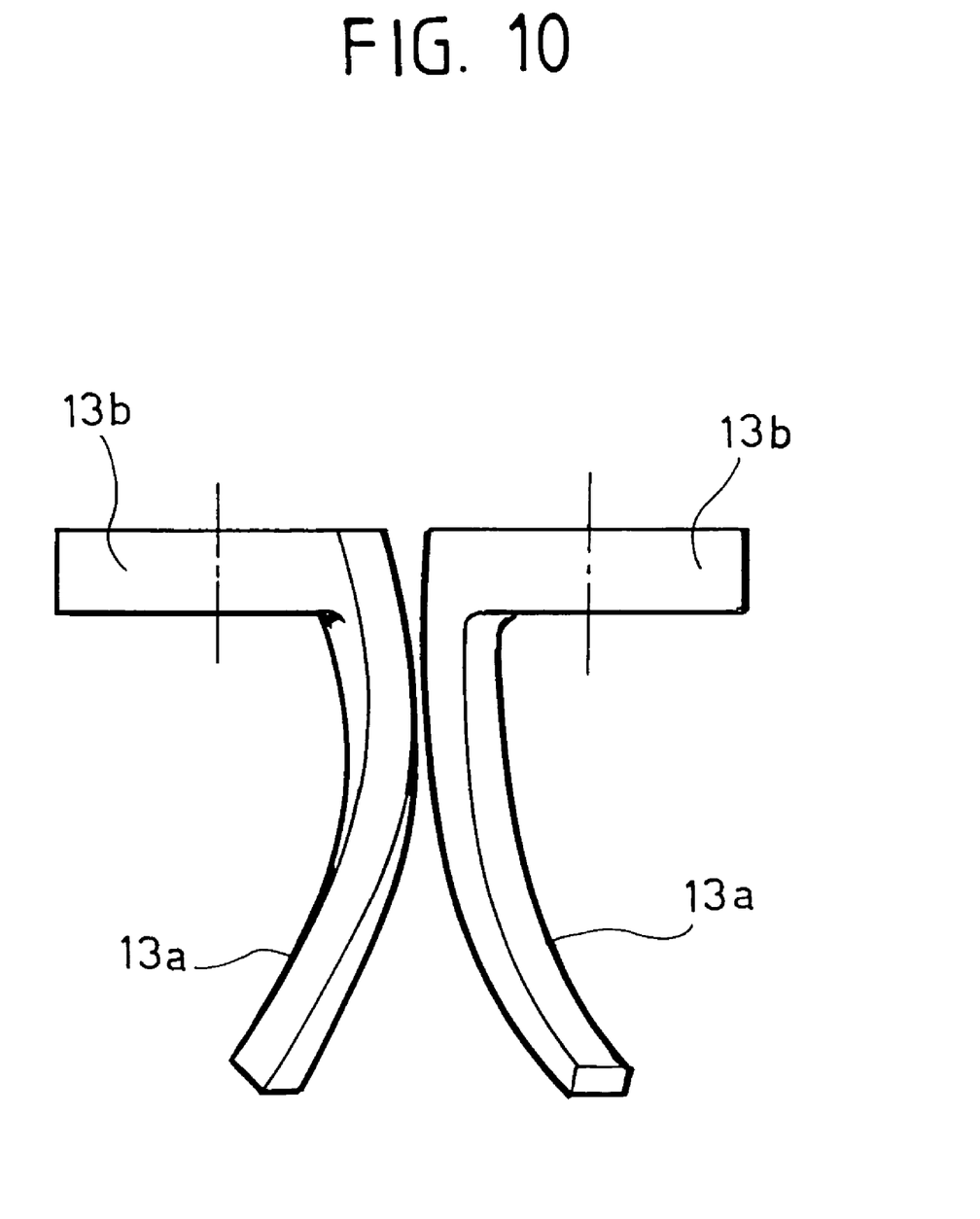
FIG. 10 is a front elevation of the two kneading implements according to a further variant.

FIG. 10 illustrates a further elevation of the two kneading implements. Of course, it is possible also to envisage that the cross section of each arm thins out in the direction of its free end.

Figure 7:
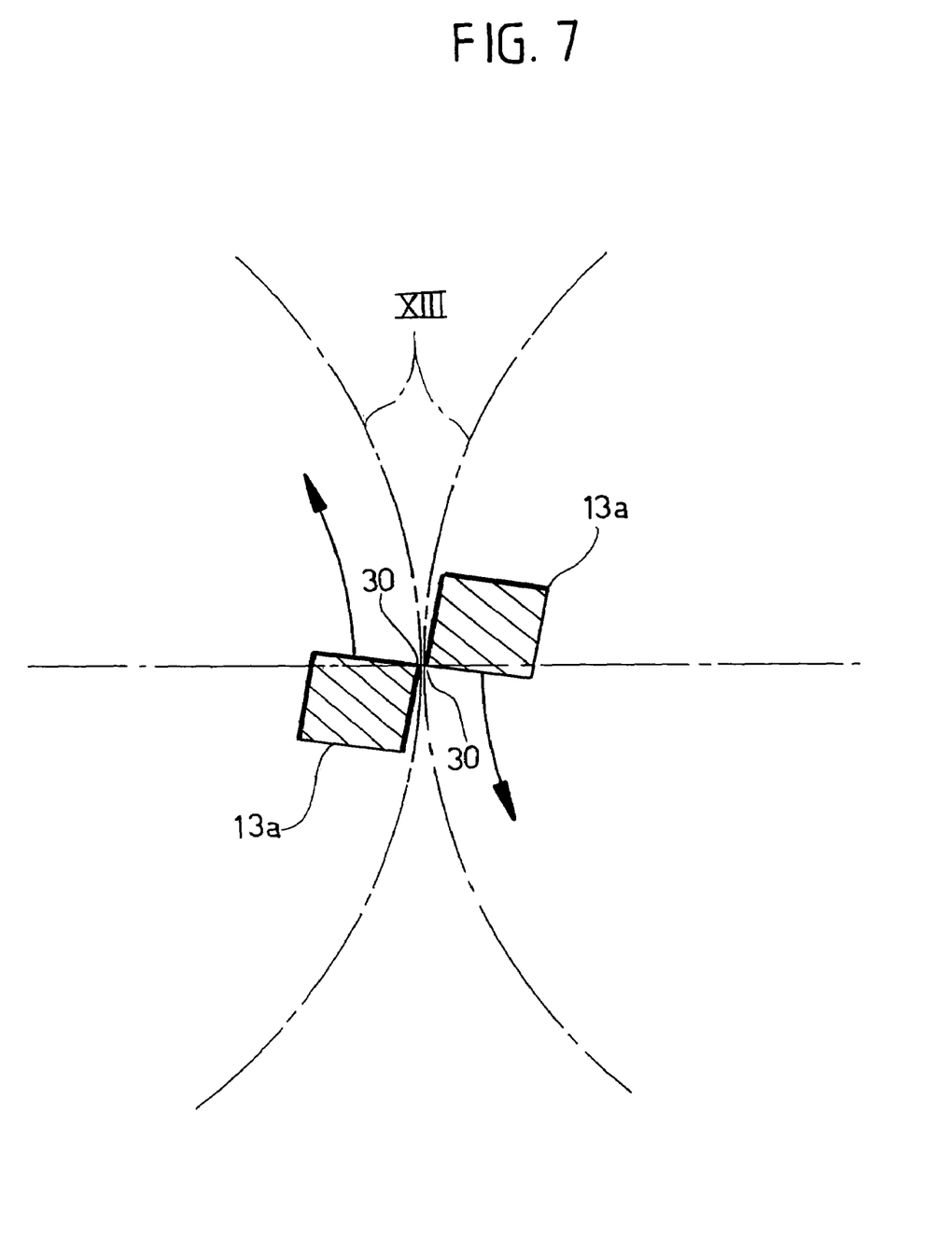
FIG. 7 is a cross-sectional view at an enlarged scale of a detail of FIG. 6.
Figure 8:
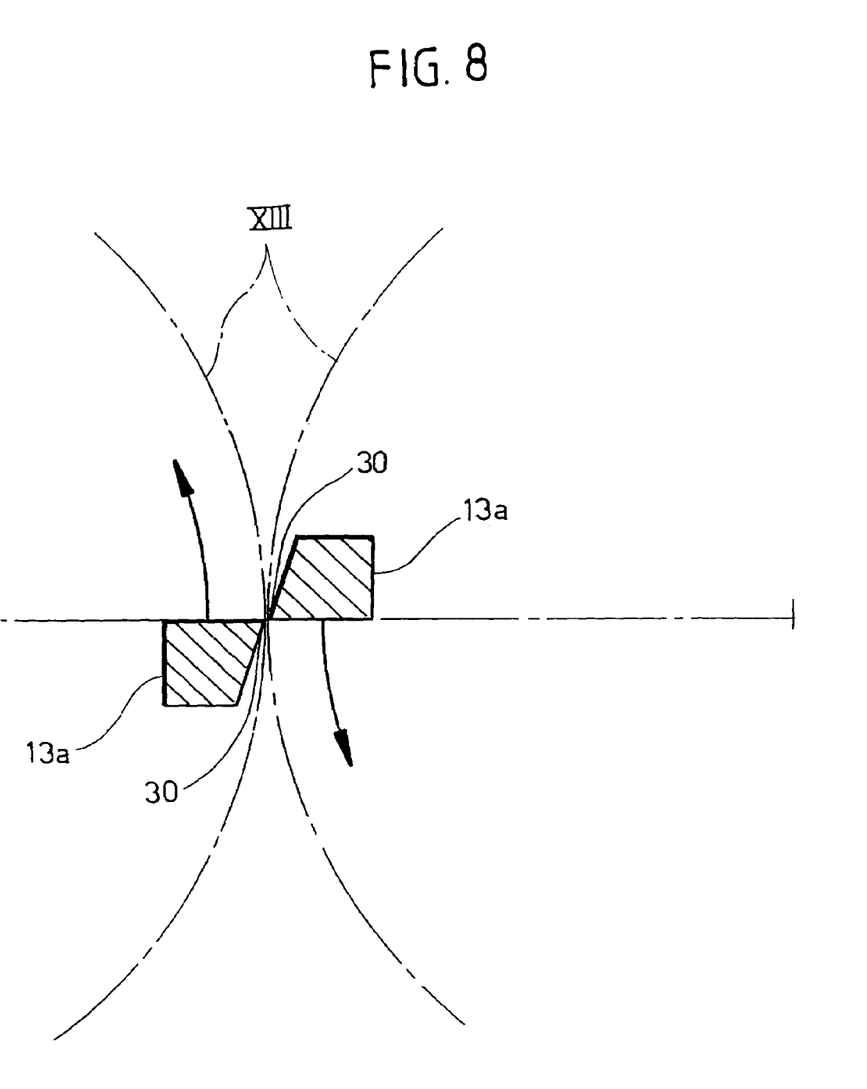
FIGS. 8 and 9 illustrate two variants of FIG. 7.
Figure 9:
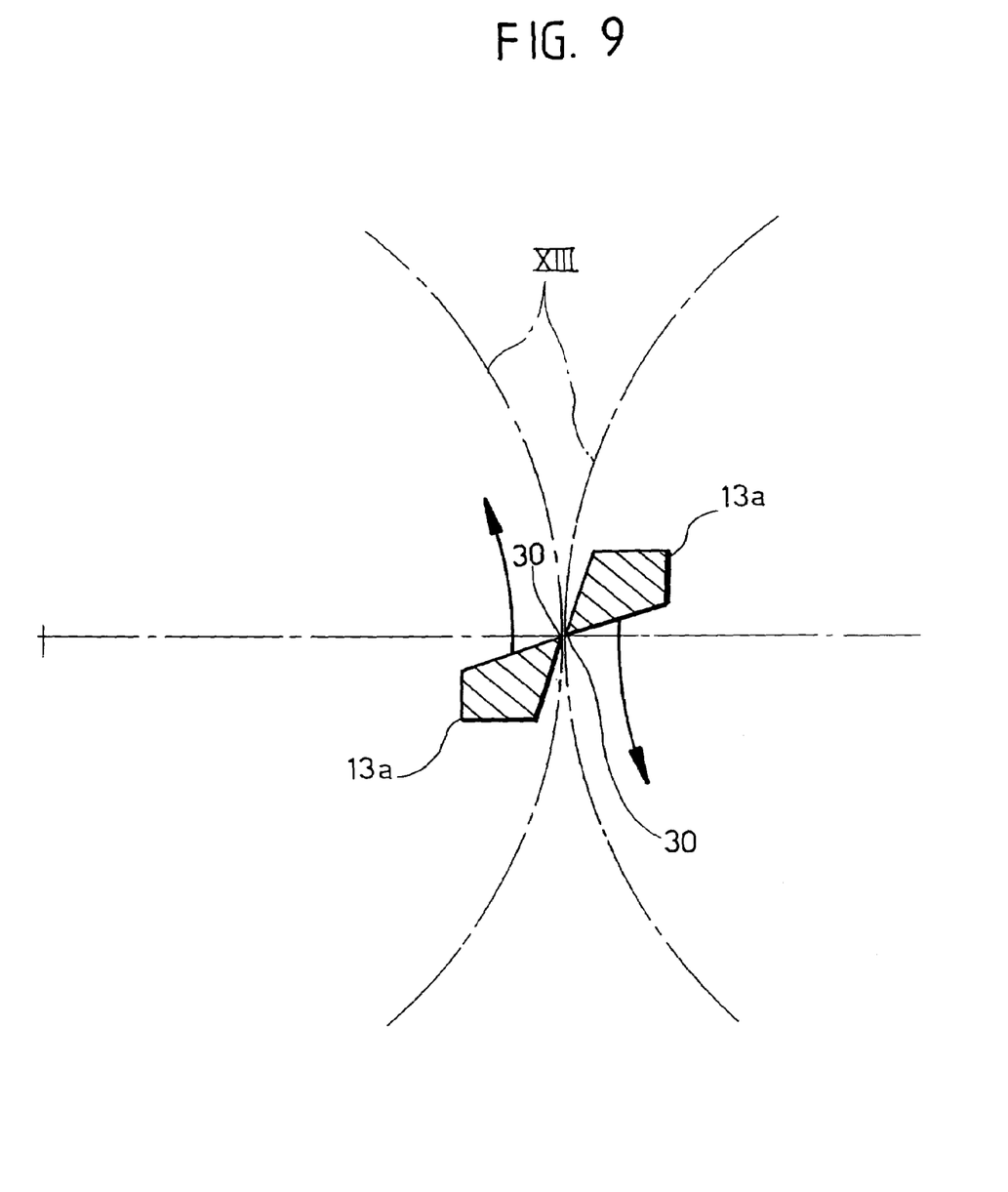
Figure 11:
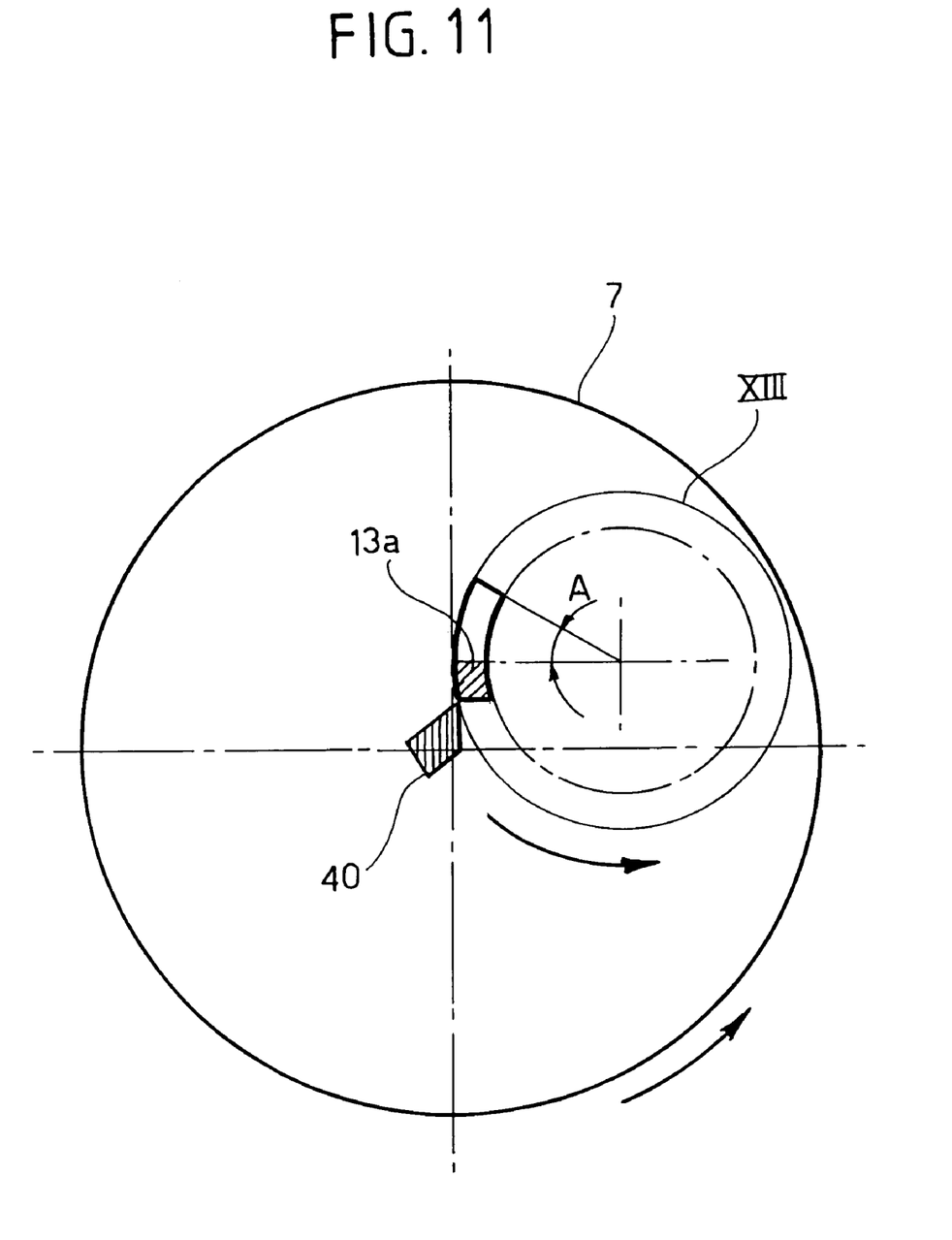
FIG. 11 is a cross-sectional view at an enlarged scale of a detail of FIG. 10.

FIG. 11 is a cross-sectional view of the two arms shown in FIG. 10 wherein the arm 40 has a cross-sectional shape similar to the cross-sectional shape of the arm 13a on the left in FIG. 8 and the arm 13a has a cross-sectional shape similar to the cross-sectional shape of the arm 13a on the right in FIG. 7.

Finally, it is in theory possible to envisage a further variant, in which the machine is provided with a single kneading implement of the type described above, which co-operates with a fixed contrast member, which projects downwards from the head of the machine within the rotating tank. Said contrast member could be represented by a fixed arm set at the area of tangency between the theoretical cylinder of the single kneading implement and the diametral plane B of the tank (FIG. 6). In this case, the shearing effect would be obtained as a result of the action of a single arm rotating in co-operation with a fixed contrast member.

Of course, without prejudice to the principle of the invention, the details of construction and the embodiments may vary widely with respect to what has been described and illustrated herein purely by way of example, without thereby departing from the scope of the present invention.

For example, it is possible to envisage more than two kneading implements co-operating with one another. In this case, it is also possible to envisage that the tank does not turning, in so far as the feed and change of the paste inside the tank are obtained by the action of the said kneading implements.

What is claimed is:

1. A kneading machine comprising:
    a rotating tank that is substantially cylindrical; and
    a pair of kneading implements turning within the tank, with concordant directions of rotation, about two axes parallel to the axis of the tank, which are substantially tangential both to one another and to the circumferential wall of the tank,
    wherein:
    each implement comprises at least one arm;
    each arm extends on the periphery and from one end to the other of the theoretical cylinder that has an axis that is coincident with the respective axis of rotation of said arm, in such a way that said arm describes an orbital movement about the respective axis of rotation;
    each arm, at least for a part of its length, is inclined with respect to a straight line generatrix of said theoretical cylinder parallel to said axis of rotation of the arm;
    the opposite ends of the two arms are staggered with respect to one another, viewed in the direction of the axis of rotation, by an angle smaller than 180° about said axis of rotation;
    means are provided for causing said arms to have orbital movements about the respective axes of rotation that are synchronized with respect to one another, in such a way that the arms pass simultaneously in the area of tangency of the respective theoretical cylinders, intersecting one another with opposite directions of movement on account of the concordant rotation of the two implements,
    wherein the aforesaid angle of staggering of the two opposite ends of each arm is between 20° and 100°, and is preferably between 20° and 45°.

2. The kneading machine according to claim 1, wherein said arms are inclined in a concordant way with respect to the generatrices of their theoretical cylinders in such a way that at their intersection in the aforesaid area of tangency they are arranged so that they cross one another, according to a scissors-like configuration.

3. The kneading machine according to claim 2, wherein each arm is set according to a portion of helix extending on the periphery of its theoretical cylinder, and from one end to the other of said cylinder, according to an angle smaller than 180°, viewed in the direction of the axis of rotation.

4. The kneading machine according to claim 3, wherein the two aforesaid theoretical cylinders have diameters that are substantially equal and heights that are substantially equal, the two portions of helix defining on said arms are substantially equal, and the speeds of rotation of the arms are also substantially equal, so that the area of tangency of the two arms shifts progressively during their intersection in a direction parallel to the axes of the two theoretical cylinders and from one end to the other of said cylinders.

5. The kneading machine according to claim 1, wherein each of the aforesaid theoretical cylinders has a diameter that is sufficiently large so that said cylinder has overall dimensions that exceed the limits of the respective quadrant of tank.

6. The kneading machine according to claim 5, wherein the two kneading implements constitute the only members present inside the tank.

7. The kneading machine according to claim 1, wherein the two arms present respective cutting edges, which are set opposite to one another when the two arms cross one another.

8. The kneading machine according to claim 7, wherein the arms have a cross section of square shape.

9. The kneading machine according to claim 7, wherein the arms have a cross section of trapezial shape.

10. The kneading machine according to claim 7, wherein said arms have a cross section of rhomboidal shape.

11. A kneading machine comprising:
    a rotating tank that is substantially cylindrical; and
    a pair of kneading implements turning within the tank, with concordant directions of rotation, about two axes parallel to the axis of the tank, which are substantially tangential both to one another and to the circumferential wall of the tank,
    wherein:
    each implement comprises at least one arm;
    each arm extends on the periphery and from one end to the other of the theoretical cylinder that has an axis that is coincident with the respective axis of rotation of said arm, in such a way that said arm describes an orbital movement about the respective axis of rotation;
    each arm, at least for a part of its length, is inclined with respect to a straight line generatrix of said theoretical cylinder parallel to said axis of rotation of the arm;
    the opposite ends of the two arms are staggered with respect to one another, viewed in the direction of the axis of rotation, by an angle smaller than 180° about said axis of rotation;

means are provided for causing said arms to have orbital movements about the respective axes of rotation that are synchronized with respect to one another, in such a way that the arms pass simultaneously in the area of tangency of the respective theoretical cylinders, intersecting one another with opposite directions of movement on account of the concordant rotation of the two implements;

wherein the aforesaid angle of staggering of the two opposite ends of each arm is between 20° and 100°, and is preferably between 20° and 45°, wherein said arms are inclined in a concordant way with respect to the generatrices of their theoretical cylinders in such a way that at their intersection in the aforesaid area of tangency they are arranged so that they cross one another, according to a scissors-like configuration, wherein each arm is set according to a portion of helix extending on the periphery of its theoretical cylinder, and from one end to the other of said cylinder, according to an angle smaller than 180°, viewed in the direction of the axis of rotation, and wherein the aforesaid portion of helix has an angle of inclination between 15° and 40°.

12. The kneading machine according to claim 11, wherein the aforesaid angle of inclination of the portion of helix is equal to approximately 20°.

* * * * *